United States Patent
Waggoner

(10) Patent No.: US 12,088,821 B1
(45) Date of Patent: Sep. 10, 2024

(54) DYNAMIC ENCODER-TIME SCALING SERVICE FOR LIVE AND ON-DEMAND ADAPTIVE STREAMING

(71) Applicant: Amazon Technologies, Inc., Seattle, WA (US)

(72) Inventor: Charles Benjamin Waggoner, Portland, OR (US)

(73) Assignee: Amazon Technologies, Inc., Seattle, WA (US)

(*) Notice: Subject to any disclaimer, the term of this patent is extended or adjusted under 35 U.S.C. 154(b) by 231 days.

(21) Appl. No.: 16/916,631

(22) Filed: Jun. 30, 2020

(51) Int. Cl.
*H04N 19/146* (2014.01)
*H04N 19/124* (2014.01)
*H04N 19/172* (2014.01)

(52) U.S. Cl.
CPC ......... *H04N 19/146* (2014.11); *H04N 19/124* (2014.11); *H04N 19/172* (2014.11)

(58) Field of Classification Search
None
See application file for complete search history.

(56) References Cited

U.S. PATENT DOCUMENTS

| | | | | |
|---|---|---|---|---|
| 5,734,419 A * | 3/1998 | Botsford, III | ......... | H04N 19/85 348/700 |
| 5,764,805 A * | 6/1998 | Martucci | ............. | H04N 19/537 375/E7.176 |
| 6,044,115 A * | 3/2000 | Horiike | ................. | H04N 19/61 375/240.18 |
| 6,507,615 B1 * | 1/2003 | Tsujii | .................. | H04N 19/177 375/E7.181 |
| 6,690,833 B1 * | 2/2004 | Chiang | ................ | H04N 19/115 375/E7.181 |
| 10,484,446 B1 | 11/2019 | Waggoner et al. | | |
| 2004/0210823 A1 * | 10/2004 | Miura | ................. | H04N 19/107 715/202 |
| 2006/0233446 A1 * | 10/2006 | Saito | .................... | H04N 19/176 375/E7.184 |

(Continued)

FOREIGN PATENT DOCUMENTS

EP    2400758 A1 * 12/2011 ........... H04N 17/004

*Primary Examiner* — Mohammed Jebari
(74) *Attorney, Agent, or Firm* — NICHOLSON DE VOS WEBSTER & ELLIOT LLP

(57) ABSTRACT

Techniques for a dynamic encoder-time scaling service for live and on-demand adaptive streaming are described. As one example, a computer-implemented method includes determining a first resolution for a first fragment of a video file based on a first encoding complexity of the first fragment at a bitrate, encoding the first fragment at the first resolution for the bitrate to generate an encoded first fragment, determining a second different resolution for a second fragment of the video file based on a second different encoding complexity of the second fragment at the bitrate, encoding the second fragment at the second different resolution for the bitrate to generate an encoded second fragment, receiving a request for a manifest for the video file from a client device, generating the manifest for the client device that identifies a single video representation for the bitrate that comprises the encoded first fragment and the encoded second fragment, and sending the manifest to the client device.

15 Claims, 10 Drawing Sheets

(56) References Cited

U.S. PATENT DOCUMENTS

| | | | |
|---|---|---|---|
| 2006/0262847 A1* | 11/2006 | Chen .................... | H04N 19/172 375/E7.181 |
| 2010/0189183 A1* | 7/2010 | Gu ..................... | H04N 21/8456 375/E7.154 |
| 2010/0316126 A1* | 12/2010 | Chen .................... | H04N 19/142 375/E7.123 |
| 2011/0013692 A1* | 1/2011 | Cohen .................. | H04N 19/139 375/240.2 |
| 2012/0294355 A1* | 11/2012 | Holcomb ............. | H04N 19/157 375/240.03 |
| 2013/0329781 A1* | 12/2013 | Su ......................... | H04N 19/10 375/240.02 |
| 2014/0307771 A1* | 10/2014 | Hemmendorff ...... | H04N 19/103 375/240.02 |
| 2016/0073106 A1* | 3/2016 | Su ...................... | H04N 21/8456 375/240.02 |
| 2016/0105728 A1* | 4/2016 | Schmidmer ...... | H04N 21/64723 725/110 |
| 2018/0367808 A1* | 12/2018 | Zhou .................... | H04N 19/127 |
| 2021/0144527 A1* | 5/2021 | Choi .................... | H04N 19/156 |

* cited by examiner

DYNAMIC ENCODER-TIME SCALING SERVICE FOR LIVE AND ON-DEMAND ADAPTIVE STREAMING

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public. Service providers or content creators (such as businesses, artists, media distribution services, etc.) can employ one or more data centers to deliver content (such as web sites, web content, or other digital data) to users or clients.

BRIEF DESCRIPTION OF DRAWINGS

Various embodiments in accordance with the present disclosure will be described with reference to the drawings, in which.

DETAILED DESCRIPTION

Figure 1:
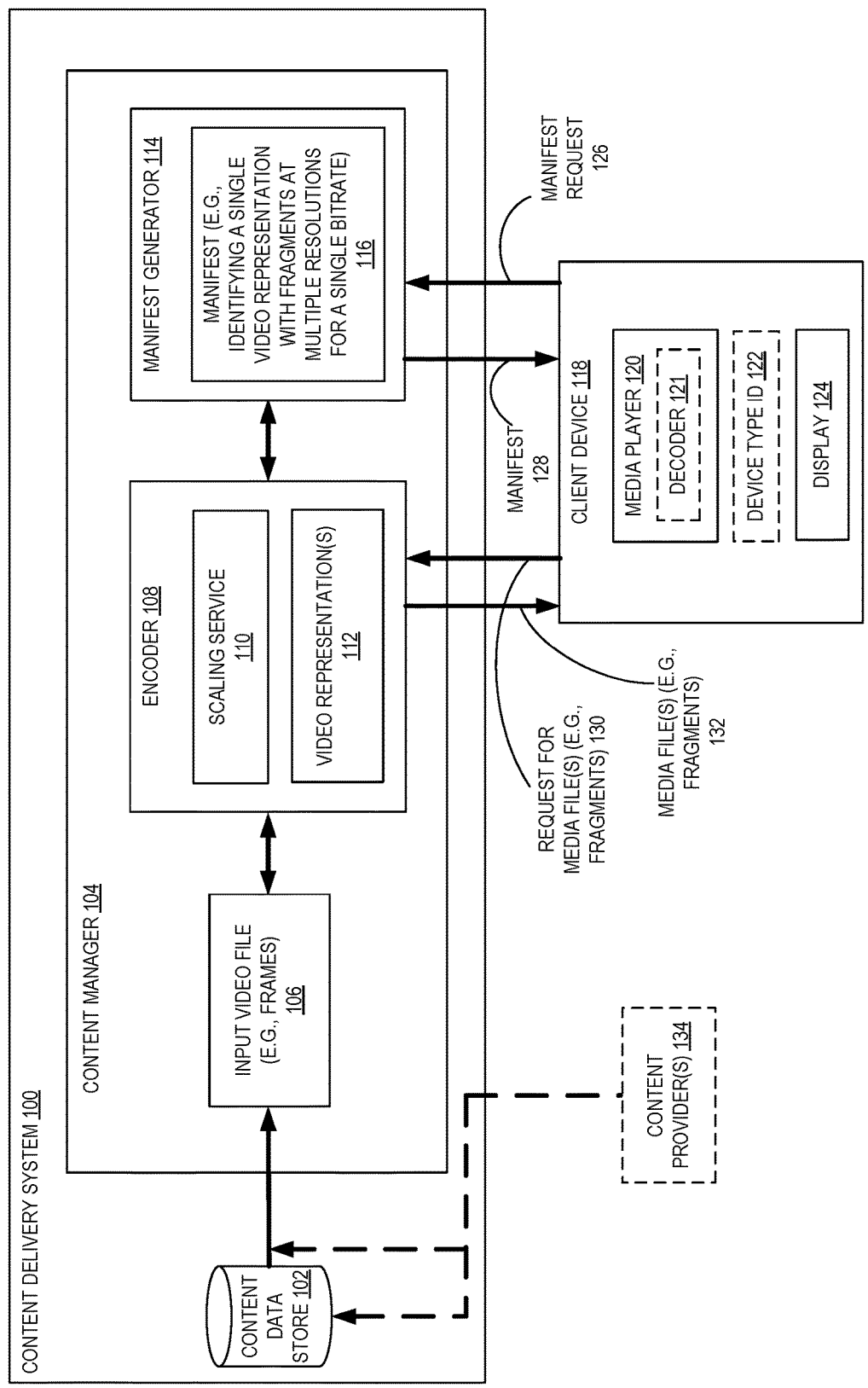
FIG. 1 is a diagram illustrating an environment including a content delivery system having an encoder according to some embodiments.

Various embodiments of methods, apparatuses, systems, and non-transitory computer-readable storage media for dynamic encoder-time scaling are described. According to some embodiments, a content delivery system includes a scaling service that is to scale each fragment of a video file with its own resolution (e.g., frame size) for a (e.g., single) target bitrate, for example, to generate a single video representation having fragments with multiple, different resolutions for the target bitrate. Certain embodiments herein determine different resolutions for different fragments of a video file based on the respective encoding complexity of the fragment at a target bitrate. In one embodiment, the fragments encoded at those different resolutions are made available to a client device.

As one example, a client device receives a manifest (e.g., manifest file) that indicates the available video representations for the video file. The manifest may be an adaptive bitrate (ABR) streaming manifest, such as a manifest according to a MPEG-DASH standard, a HyperText Transfer Protocol (HTTP) Live Streaming (HLS) standard, or a Smooth Streaming standard. Use of a manifest allows a client device to retain primary control over the streaming of the media in certain embodiments.

Streaming technologies may deliver one or more sets of video representations (e.g., as identified in an ABR bitrate ladder) to a (e.g., client) device. These representations form the encoded package that is finally delivered to the device in certain embodiments. In one embodiment, the manifest identifies the set of available video representations for the device, for example, by providing a bitrate ladder (e.g., file) to the device. In one embodiment, the manifest is a Media Presentation Description (MPD) document. In one embodiment, the manifest identifies the Uniform Resource Locator (URL) or URLs to access the file(s) for the video representations.

The design of the optimal set of representations is complicated due to the large number of supported bitrates and supported display devices, for example, with each device having a varying set of capabilities (e.g., the constraints caused by those capabilities). The bitrate for delivered content may be the bits per second consumed by a sequence of frames (e.g., fragments). The bitrate may be the average number of bits per frame (e.g., bits per picture) divided by the number of frames per second. The bitrate between a content delivery system and client device may be the (e.g., reliable) network bandwidth that is provisioned or available for the stream of the video representation to be played.

In one embodiment, adaptive streaming uses alternative video representations (e.g., "encodes") of the same content (e.g., video file) that can be switched between, for example, based on the available bitrate for the network providing the content to the media player. In certain embodiments, these alternate video representations form a bitrate "ladder" where each rung adds additional bitrate (and may increase frame size). For example, a first rung for a first resolution (e.g., 1280 pixels in width×720 pixels in height ("720p")) and the bitrate or bitrates supported at that resolution (e.g., having a video representation (e.g., stream) that is encoded for each resolution and bitrate pairing), a second rung for a second, different resolution (e.g., 1920 pixels in width×1080 pixels in height ("1080p")) and the bitrate or bitrates supported at that resolution (e.g., having a video representation (e.g., stream) that is encoded for each resolution and bitrate pairing), a third rung for a third, different resolution (e.g., 3840 pixels in width×2160 pixels in height ("4K Ultra-High-Definition (UHD)")) and the bitrate or bitrates supported at that resolution (e.g., having a video representation (e.g., stream) that is encoded for each resolution and bitrate pairing). A bitrate ladder may be generated for a particular video file (e.g., a particular "title").

Heuristics in certain media (e.g., video) players assume that quality is proportional to the bitrate (e.g., available bitrate), and attempt to download and play the video representation (e.g., all at a same resolution) having the highest bitrate of the available bitrate (e.g., based on the network conditions). While this may work well for content that is very consistent in detail and complexity, real-world content can vary enormously. In a movie, an action scene might need a certain bitrate (e.g., 2500 kilobits per second (Kbps)) to deliver an action scene at a first resolution (e.g., 720p), while credits can be done at a higher resolution (e.g., 1080p) at a much lower bitrate (e.g., 50 Kbps). Certain embodiments vary bitrate based on complexity, e.g., so a client device can switch to higher resolutions when content is easier and lower resolutions when content is harder.

However, in certain embodiments there is an assumption that rungs of a bitrate ladder are always monotonic in all of quality, resolution (e.g., frame size), and fragment size simultaneously. In the real world, the optimal resolution (e.g., frame size) and bitrate pairing may vary significantly based on the content with a particular video file. For example, an action scene with motion blur may have no details that cannot be captured at a first resolution (e.g., 720p) even if the source video file is at a higher, second resolution (e.g., 4K). Thus, the optimal resolution (e.g., frame size) to maximize quality at a given bitrate can be highly variable.

Certain embodiments herein perform a more optimal encoding by matching resolution (e.g., frame size and/or shape) to the content (e.g. and computational requirements). Certain embodiments herein determine a respective resolution for each proper subset of frames (e.g., fragments, segments, etc.) of a single video file. For example, with an encoder (e.g., scaling service thereof) determining a first resolution for a first fragment of a video file based on a first encoding complexity of the first fragment at a bitrate, encoding the first fragment at the first resolution for the bitrate to generate an encoded first fragment, determining a second different resolution for a second fragment of the video file based on a second different encoding complexity of the second fragment at the bitrate, and encoding the second fragment at the second different resolution for the bitrate to generate an encoded second fragment. The complexity of a video file may be the spatial detail complexity and/or temporal complexity.

After encoding, a manifest may then be generated that identifies a single video representation for the bitrate that comprises the encoded first fragment and the encoded second fragment. Thus, when a client device (e.g., media player thereof) is playing the content at the (e.g., target) bitrate, the single video representation can be decoded and played by the media player at the varying resolutions (e.g., upscaled by the client device to fill the available display window).

Further, encoding performance can vary significantly with content, e.g., with more complex or less complex encodings at that resolution, e.g., more or less bits used to encode each pixel (e.g., where a single resolution can have multiple encoding qualities). Thus, complex detail and motion can take significantly (e.g., 10 times) more encoding compute per pixel to encode relative to simple, largely static content. In the case where encoding time is a constraint, especially with live encoding, being able to reduce resolution for a bitrate when faced with complexity can allow more encoding compute per pixel to further improve quality at the bitrate.

The scaling down of the resolution for a given bitrate may not be linear on both axes in certain embodiments. For example, content with a fast horizontal pan may have significantly more detail on the vertical axis than the horizontal due to motion blur. So, certain embodiments herein can encode that scene (e.g., fragments thereof) at an anamorphic resolution (for example, scaling along a single axis, e.g., scaling to 960×1080 instead of 1920×1080) such that the single video representation looks better at a given bitrate than the native resolution (e.g., 1080p), for example, where an adaptive streaming clients can accept anamorphic content if the sample aspect ratio metadata is set correctly.

FIG. 1 is a diagram illustrating an environment 101 including a content delivery system 100 having an encoder 108 according to some embodiments. The depicted content delivery system 100 includes a content data store 102, which may be implemented in one or more data centers. As one example, a media file (e.g., a video) that is to be processed (e.g., encoded for playback by a client device 118) is accessed from the content data store 102 by content manager 104. In certain embodiments, encoder 108 receives a media file 106 (e.g., a video) and a request to generate one or more single video representations for a given bitrate, and generates the one or more single video representations 112 (e.g., streams) by changing the scale (e.g., downscale by a given value (e.g., percentage)) from the input medial file 106.

It is generally unrealistic to encode the media file 106 into an almost boundless number of video representations. Instead, embodiments herein generate a manifest 116, by manifest generator 114, of the available video representations (e.g., stored in content delivery system 100), e.g., for playing by a media player 120 (e.g., decoding the encoded content by decoder 121 of the media player 120) of a particular client device 118 (e.g., based on the client device's display 124 resolution). In certain embodiments, the content is stored in the content delivery system 100 in two parts: (i) the manifest of all available video representations (e.g., their URL addresses and, optionally, other characteristics, and (ii) the video representations (e.g., stream of segments) in a single or multiple files. In one embodiment, a client device is to read (or store) a manifest before the client device may make a request for the media from that manifest.

Client device 118 includes a media player 120 (e.g., to play media streams) and a display 124 to show the video of the media file (e.g., video file). Client device 118 may include storage that stores a device type identification (DTID) value 122 to indicate the client device's (e.g., maximum) resolution of its display 124.

As one example, a client device 118 sends a manifest request 126 for a manifest of a media file (e.g., video file) of content delivery system 102. In certain embodiments, receipt of manifest request 126 causes manifest generator to determine the device resolution (e.g., from a field of device type ID 122, and thus send back a manifest 128 identifying media file(s), e.g., the one or more video representations for that particular device based on that device resolution. Client device 118 may send a request 130 for a media file(s) (e.g., as identified by the manifest 128) and then receive the media file(s) 132, e.g., from content delivery system 100.

In certain embodiments, one or more portions (e.g., fragments, segments, chunks, etc.) of the media file 106 (e.g., a video) from content data store 102 and/or (e.g., live content from) content providers 134 is to be resized by scaling service 110, for example, such that the scaled frames (e.g., fragments formed from multiple frames) for a single video representation 112 are at an optimal encoding for the bitrate between client device 118 and the encoded media file(s) 132. The maximum resolution of the single video representation 112 may be the maximum resolution of the display 124 or a proper subset of the display allotted to displaying the media file. Embodiments herein thus allow for the forming of a manifest 116 identifying a single video representation with fragments at multiple encoding resolutions for a single bitrate (e.g., to be displayed on a display 124 having a display resolution less than or equal to a maximum of the multiple encoding resolutions).

Figure 2:
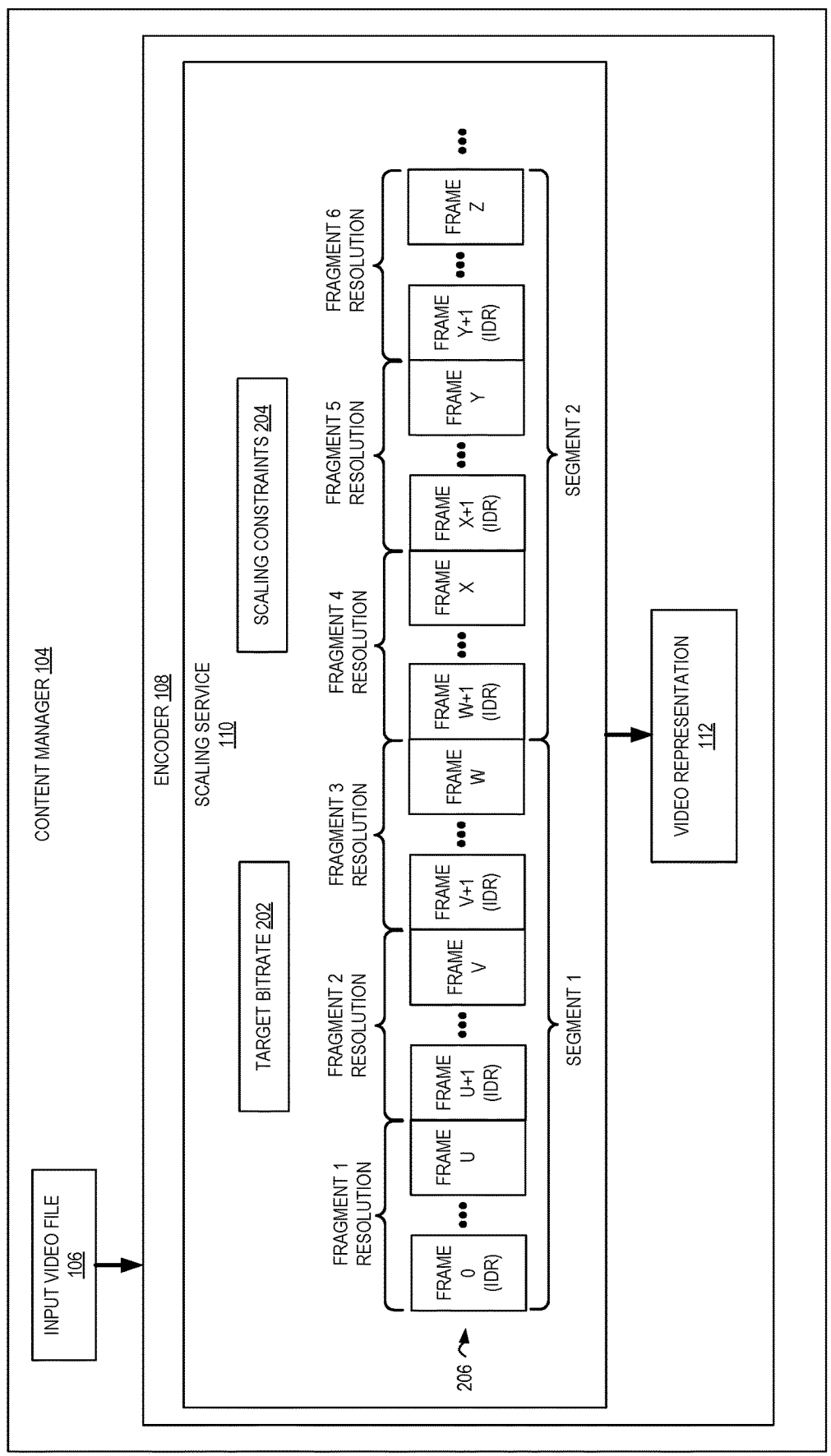
FIG. 2 is a diagram illustrating an encoder including a scaling service according to some embodiments.

FIG. 2 is a diagram illustrating an encoder 108 including a scaling service 110 according to some embodiments. In certain embodiments, encoder 108 performs video encoding to compress and/or convert the input video file 106 to a different format (e.g., according to a video compression standard (video codec) of video content. The compression may be performed to compress the input video file 106 into a smaller file or files, e.g., by removing certain data of the video. During decompression (e.g., decoding) for playback, an approximation of the original video file 106 is created, for example, with the more compression being applied causing more data to be thrown out and the worse the approximation looks versus the original.

In FIG. 2, input video file 106 (e.g., a portion thereof) has been encoded into encoded data 206 (e.g., a compressed version of the corresponding data of video file 106). Encoded data 206 includes a plurality of fragments (e.g., fragments 1-6) and a plurality of segments (e.g., segment 1 formed from fragments 1-3 and segment 2 formed from fragments 4-6). It should be understood that these are merely example numbers and any other numbers may be used in certain embodiments. A fragment may have a time duration (e.g., selected from about 2 seconds to about 5 seconds in duration). A fragment may have a smaller time duration than a segment duration. A fragment time duration may be the same for the entire encoded data 206 version of input video file 106.

Each fragment of encoded data 206 may be formed from a plurality of frames of vide file 106. Multiple types of frames may be utilized, e.g., according to the video compression standard utilized. According to implementations for certain encoded data (e.g., streams), each fragment includes several frame types with the frame type defining the kind of dependency allowed for that frame. In general, dependencies between frames are used to support data compression, e.g., understanding how frames before or after a frame are similar allows encoding only the differences between nearby frames in the same fragment, resulting in significant improvements in minimizing the required bitrate to transmit the compressed data.

In certain embodiments, an instantaneous decoder refresh (IDR) frame is the first frame of every fragment and/or segment and does not depend on any other frames, e.g., it can be decoded (e.g., by decoder 121 in FIG. 1) without reference to any other frame. An IDR frame indicates to the decoder that everything that has happened up to that point in the encoded video stream is no longer relevant, e.g., it resets the decoder. In certain embodiments, non-IDR (i) frames are similar to an IDR frame in they do not reference other frames, however, these i frames do not reset the decoder like an IDR frame. In certain embodiments, predictive (P) frames can reference an IDR, i, or P frame, but no B or b frames (discussed below). If a P frame fails to decode, generally no more frames can be played for the rest of the fragment. In certain embodiments, reference bidirectional (B) frames can reference a prior IDR frame (e.g., the one that begins the same fragment), and prior or subsequent i, P, or B frames, but no b frames. If a B frame fails to decode, generally no more frames can be played until the next P (or in some cases B) frame in the fragment is decoded, e.g., if a B frame is dropped playback can be resumed at a subsequent P (or B) frame. In certain embodiments, non-reference bidirectional (b) frames can reference any prior or subsequent frame of any type other than another b frame, e.g., no other frame types reference b frames. Failure to decode a b frame has no impact on playback of future frames. In some video compression standard(s), multiple tiers of b frames can exist.

In certain embodiments, input video file 106 is formed from a plurality of frames where each frame is formed from rows and columns of pixels. A pixel can be specified by saying which column and which row contains it. In terms of coordinates, a pixel can be identified by a pair of integers giving the column (e.g., width) number and the row (e.g., height) number. To change the scale of (e.g., downscale) a video file (or image), it may be desirable to combine multiple pixels into a single "equivalent" pixel in the scaled video file (or scaled image).

In embodiments herein, scaling service 110 is to receive, as an input, the encoded data 206 of input video file 106, determine a resolution for each fragment of encoded data 206, and cause encoder 108 to encode each fragment at its determined resolution to generate a corresponding video representation 112 (e.g., the file(s) that are to be downloaded/streamed by a client device for playback of video approximating the input video file 106. In certain embodiments, the scaling service determines a resolution for each fragment that will allow that fragment to be transmitted according to a target bitrate 202. This process may be repeated for a plurality of target bitrates.

In certain embodiments, scaling service 110 analyzes the fragments created from input video file 106 to determine a complexity (e.g., an encoding complexity) of the fragments (e.g., frames thereof), for example, and that complexity utilized to select a resolution from a plurality of candidate resolutions for each fragment. Although an example of fragment level granularity of resolution determining is discussed above, other granularities may be utilized (e.g., a segment level granularity with all fragments in a particular segment having a same resolution). The scaling service may receive, as an input, certain scaling constraints 204, e.g., as discussed further in reference to FIG. 3.

Complexity of a fragment may be the rated complexity of each IDR frame of that fragment. For example, for a single bitrate 202, scaling service 110 may determine that IDR frame 0 of fragment 1 has a first complexity (e.g., below a threshold) and fragment 1 is to be encoded at a first resolution (e.g., 1080p) for bitrate 202, but that IDR frame U+1 of fragment 2 has a second, higher complexity (e.g., above a threshold) and thus fragment 2 is to be encoded at a second, lower resolution (e.g., 720p) for bitrate 202, e.g., with these two different resolutions of fragments combined into a single video representation 112 (e.g., a single stream corresponding to bitrate 202). Complexity of a fragment may be the aggregate complexity of the frames of that fragment.

In certain embodiments, scaling service 110 analyzes the fragments created from input video file 106 to (e.g., independently) determine a resolution from a plurality of candidate resolutions for each fragment, such that the resolution for fragment 1 is not necessarily the same as the resolution for fragment 2, etc.

In certain embodiments, scaling service 110 analyzes the fragments created from input video file 106 to (e.g., independently) determine a resolution from a plurality of candidate resolutions for each fragment based on a distortion metric (e.g., exceeding a threshold) from an initial encode, e.g., re-encoding the fragment(s) that exceed the distortion metric at a lower resolution (e.g., frame size).

In certain embodiments, scaling service 110 analyzes the fragments created from input video file 106 to (e.g., independently) determine a resolution from a plurality of candidate resolutions for each fragment based on a quantization parameter (e.g., exceeding a threshold) from an initial encode, e.g., re-encoding the fragment(s) that exceed the quantization parameter metric at a lower resolution (e.g., frame size). In certain embodiments, the quantization parameter determines the step size for associating transformed coefficients with a finite set of steps, for example, with large values of QP representing large steps that crudely approximate a spatial transform, so that most of the signal can be captured by only a few coefficients. Small values of QP more accurately approximate the block's spatial frequency spectrum, but at the cost of more bits. In certain encoding standards, each unit increase of QP lengthens the step size by a certain value (e.g., about 12%) and reduces the bitrate by a certain value (e.g., about 12%).

In certain embodiments, encoding including quantization that coverts pixels into frequency data (e.g., via a fast Fourier transform (FFT)). For example, by look at the difference in P frame from an IDR frame and detecting where most of bits should be (e.g., vertical vs. horizontal), e.g., if there are 0s for horizontal detail difference (delta) there may not be much horizontal detail and thus horizontal scaling may be performed in certain embodiments.

In certain embodiments, the scaling of input frame(s) of a fragment to a resolution determined for that fragment for video representation 112 includes combining a proper subset of pixels of an input frame into single pixel, e.g., combining the luminance (Y) component, blue projection chrominance (U) component, and projection chrominance (V) component for each pixel into a single, respective luminance (Y) component, blue projection chrominance (U) component, and projection chrominance (V) component.

The scaling may be constrained by the possible media player or players that are desired for use of video representations. For example, based on what resolutions a media player supports, e.g., without causing a perceptible quality issue by a user.

Figure 3:
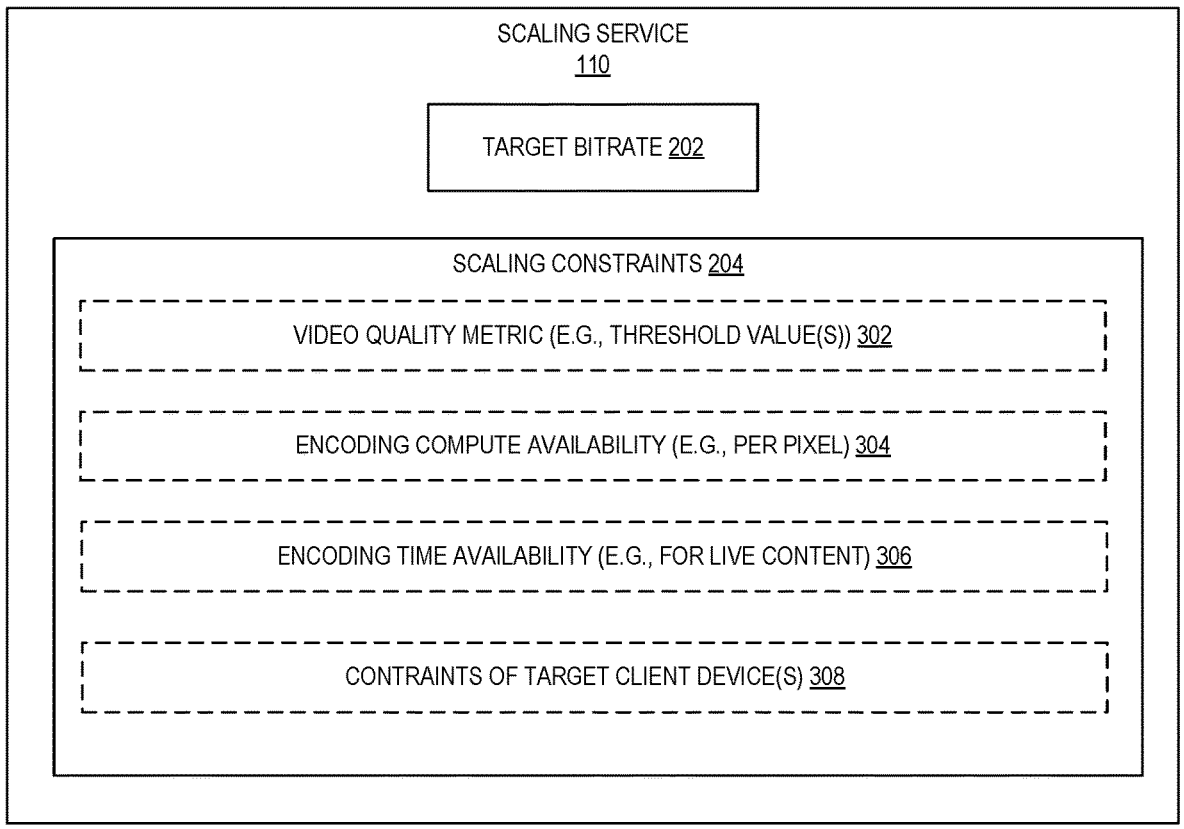
FIG. 3 is a diagram illustrating a scaling service having a target bitrate and scaling constraints according to some embodiments.

FIG. 3 is a diagram illustrating a scaling service 110 having a target bitrate 202 and scaling constraints 204 according to some embodiments. The scaling by scaling service 110 may be limited by scaling constraints 204. For example, scaling service 110 may select the resolutions based on (e.g., target bitrate 202 and) unscaled bitrate (e.g., at top resolution) to provide data to drive the resolution choices. For high latency (e.g., video-on-demand), scaling service 110 may select the resolutions based on (e.g., target bitrate 202 and) the reference stream (e.g., input file 106) as a lookahead. For low latency (e.g., live streaming video), scaling service 110 may select the resolutions based on (e.g., target bitrate 202 and) a (e.g., immediately) prior fragment's determined resolutions (e.g., its imputed ideal frame size), e.g., an override that resolution when a different resolution when there is an issue (e.g., when the stream does not timely encode). For example, scaling service 110 may select the resolutions based on (e.g., target bitrate 202 and) vertical versus horizontal frequency distribution, e.g., and scale more on the less detailed axis. For example, scaling service 110 may select the resolutions to scale down (e.g., lower) the resolution of one or more of the fragments (e.g., segments) to preserve quality at bitrate 202. For example, scaling service 110 may select the resolutions to scale down (e.g., lower) the resolution of one or more of the fragments (e.g., segments) to the highest resolution that retains all visually relevant detail. For example, scaling service 110 may select the resolutions to scale down (e.g., lower) the resolution of one or more of the fragments (e.g., segments) to fix quality and/or bitrate. For example, scaling service 110 may select the resolutions based on (e.g., target bitrate 202 and) such that the resulting fragment resolutions are a certain size of pixel block, e.g., a multiple of 16 block of pixels (mod 16), e.g., where certain client devices require that certain size of pixel block. For example, scaling service 110 may select the resolutions based on (e.g., target bitrate 202 and) such that the resulting fragment resolutions are limited to a proper subset of possible aspect ratios (e.g., candidate ratios according to a Society of Motion Picture and Television Engineers (SMPTE) standard). Certain embodiments herein utilize an algorithm to determine that constraint. Certain embodiments herein utilize one or more tables of legal sizes per picture aspect ratio. Certain embodiments herein determine permitted error for the change in resolutions (e.g., when switching between fragments of differing resolutions), such that the error is less than a threshold (e.g., less than about 0.5 pixel on either axis).

For example, scaling service 110 may select the resolutions based on (e.g., target bitrate 202 and) such that the resulting fragment resolutions increase the encoder speed, for example, to redistribute encoding compute resources to certain frame(s)/fragments(s) when the content is challenging and/or to balance total output of the encode (e.g., in pixels/second) across streams. In certain embodiments, encoder is to only encode as many streams as provide a differentiated value, e.g., more streams with more complex (e.g., difficult) content, and fewer with simpler content.

For example, scaling service 110 may select the resolutions based on (e.g., target bitrate 202 and) a video quality metric 302 (e.g., exceeding a threshold value). Video quality metric 302 may be generated by scaling service 110. Video quality metric may be a Video Multimethod Assessment Fusion (VMAF) quality metric, e.g., of each fragment. Video quality metric may be a just-noticeable difference (JND) quality metric, e.g., of each fragment. Video quality metric may be used to compare quality at different resolutions for each proper subset of the video (e.g., fragments, segment, etc.). Segment can be time period (e.g., 2 seconds to 5 seconds), e.g., to align with a scene change in the video file.

For example, scaling service 110 may select the resolutions based on (e.g., target bitrate 202 and) an encoding compute availability 304 (e.g., per pixel). For example, performing more or less complex encodings at that resolution (for example, more or less bits per pixel, e.g., where a single resolution can have multiple encoding quality levels).

For example, scaling service 110 may select the resolutions based on (e.g., target bitrate 202 and) an encoding time availability 306 (e.g., for live content), e.g., time allotted to generate a fragment). The amount of time available to perform an encode may be dependent on determining the resolutions and encoding the fragments at those resolutions in real time. Events that are described herein as occurring in real time or near real time can happen as instantaneously as possible, limited by certain factors such as the time required for transferring data (e.g., requests and responses) between computing devices, and the ability of computer hardware and software to process information. Real time (or near real time) can also mean immediately, as it happens; e.g., in the context of a system that processes data, these terms may mean processing data as it is received as opposed to storing or persisting the data once received for processing later on.

For example, scaling service 110 may select the resolutions based on (e.g., target bitrate 202 and) constraints of target client devices 308, e.g., media player (e.g., decoder thereof) constraints (e.g., supported pixel block size, supported aspect ratios, etc.).

Embodiments herein allow for streaming at a single bitrate a single video representation with multiple (e.g., dynamic varying) resolutions for fragments, e.g., reserving some bitrate for the corresponding audio for the video file as well. Embodiments herein may utilize a mixture of square pixel resolution(s) and non-square pixel resolution(s). Certain embodiments herein limit the encoded resolution to be one or more resolutions for a set of given aspect ratios (e.g., 2.35:1, 2.39:1, 2.4:1, 16:10, 16:9, 5:3, etc.).

Figure 4:
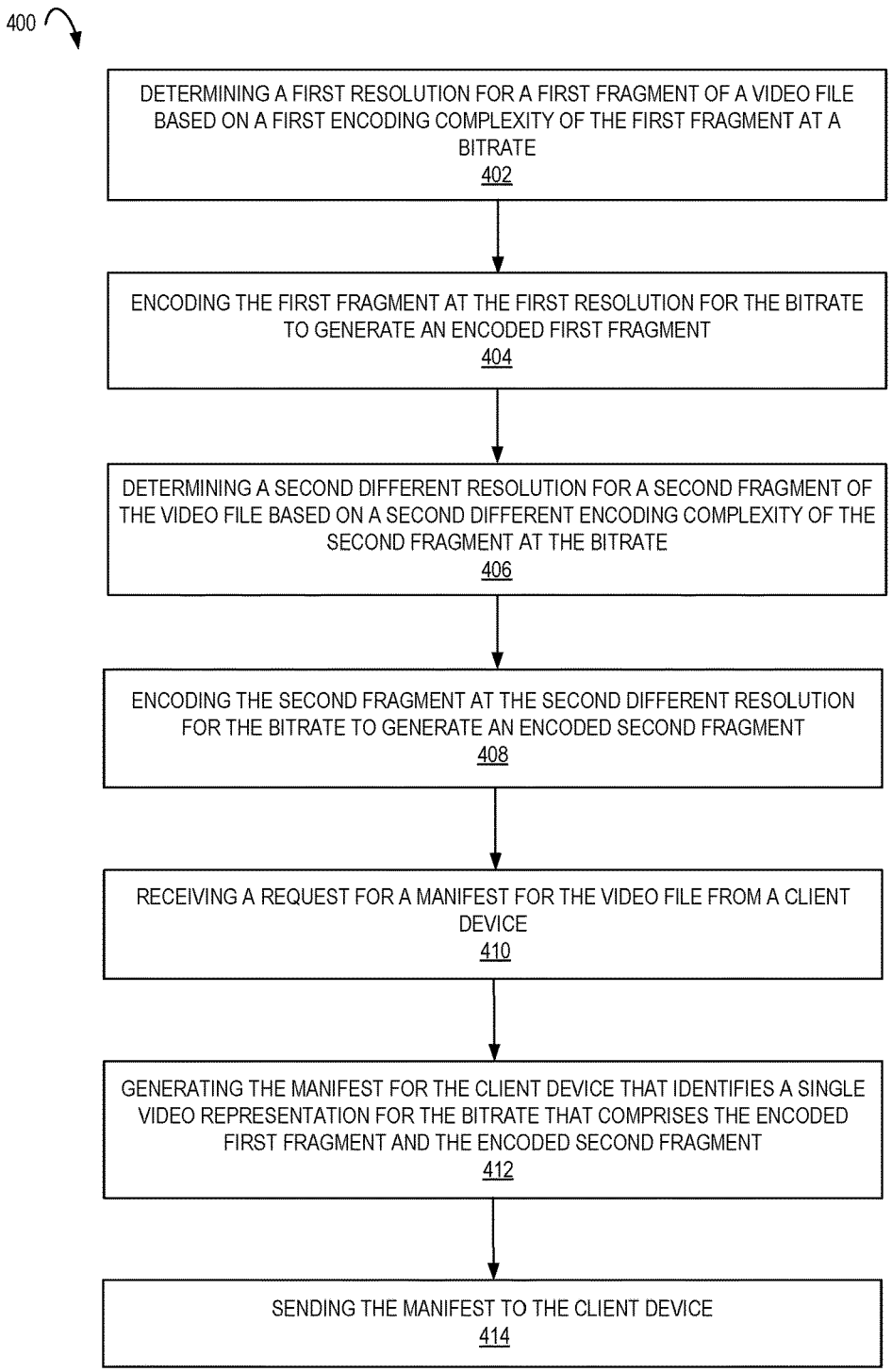
FIG. 4 is a flow diagram illustrating operations of a method for servicing a manifest request from a client device for a single video representation having fragments with multiple, different resolutions according to some embodiments.

FIG. 4 is a flow diagram illustrating operations 400 of a method for servicing a manifest request from a client device for a single video representation having fragments with multiple, different resolutions according to some embodiments. Some or all of the operations 400 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 400 are performed by a scaling service 110 of the other figures.

The operations 400 include, at block 402, determining a first resolution for a first fragment of a video file based on a first encoding complexity of the first fragment at a bitrate. The operations 400 include, at block 404, encoding the first fragment at the first resolution for the bitrate to generate an encoded first fragment. The operations 400 include, at block 406, determining a second different resolution for a second fragment of the video file based on a second different encoding complexity of the second fragment at the bitrate. The operations 400 include, at block 408, encoding the second fragment at the second different resolution for the bitrate to generate an encoded second fragment. The operations 400 include, at block 410, receiving a request for a manifest for the video file from a client device. The operations 400 include, at block 412, generating the manifest for the client device that identifies a single video representation for the bitrate that comprises the encoded first fragment and the encoded second fragment. The operations 400 include, at block 414, sending the manifest to the client device.

Figure 5:
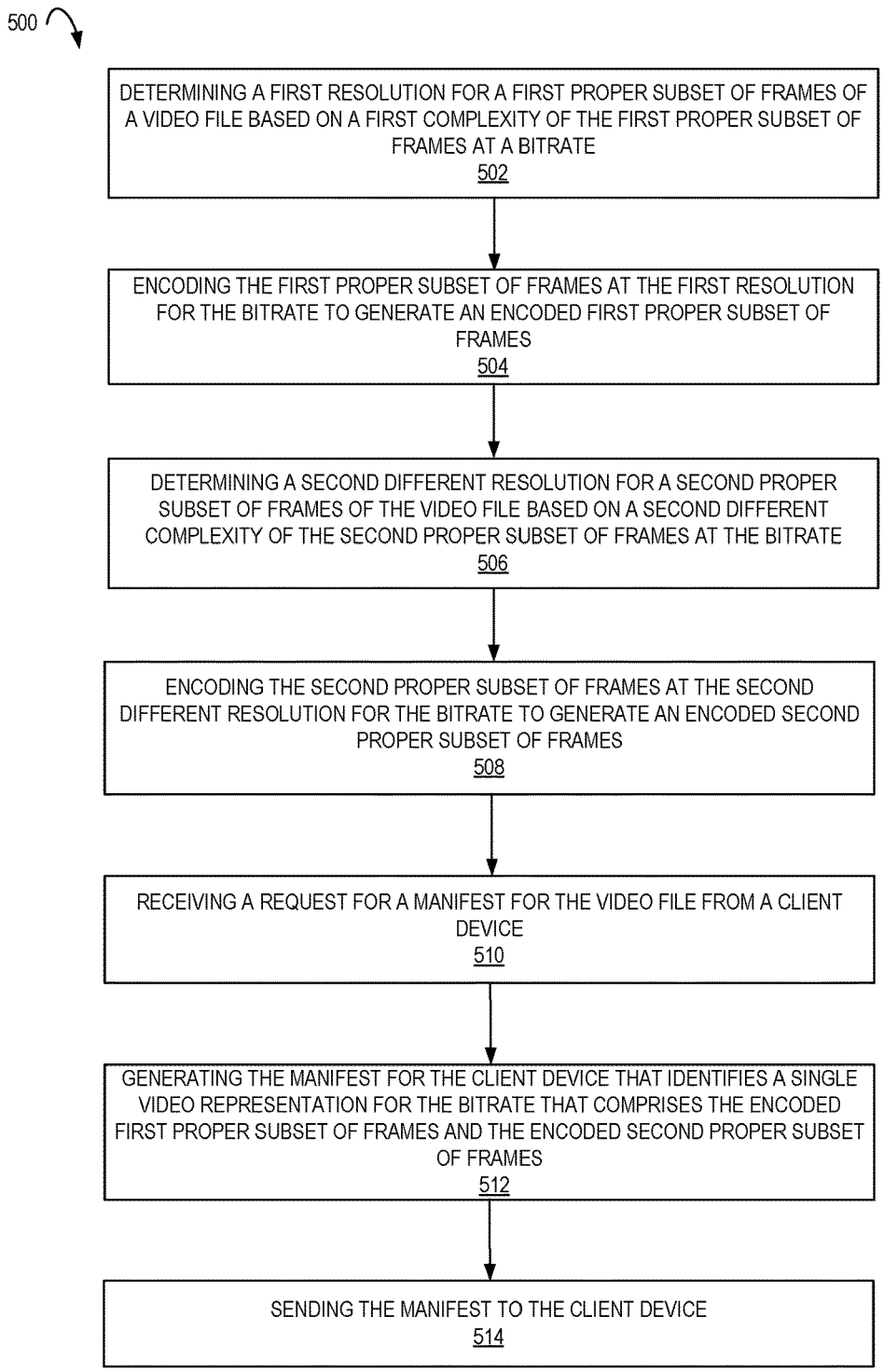
FIG. 5 is a flow diagram illustrating operations of a method for servicing a manifest request from a client device for a single video representation having proper subsets of frames with multiple, different resolutions according to some embodiments.

FIG. 5 is a flow diagram illustrating operations 500 of another method for servicing a manifest request from a client device for a scaled video representation according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by a scaling service 110 of the other figures.

The operations 500 include, at block 502, determining a first resolution for a first proper subset of frames of a video file based on a first complexity of the first proper subset of frames at a bitrate. The operations 500 include, at block 504, encoding the first proper subset of frames at the first resolution for the bitrate to generate an encoded first proper subset of frames. The operations 500 include, at block 506, determining a second different resolution for a second proper subset of frames of the video file based on a second different complexity of the second proper subset of frames at the bitrate. The operations 500 include, at block 508, encoding the second proper subset of frames at the second different resolution for the bitrate to generate an encoded second proper subset of frames. The operations 500 include, at block 510, receiving a request for a manifest for the video file from a client device. The operations 500 include, at block 512, generating the manifest for the client device that identifies a single video representation for the bitrate that comprises the encoded first proper subset of frames and the encoded second proper subset of frames. The operations 500 include, at block 514, sending the manifest to the client device.

Exemplary environments, systems, etc. that the above may be used in are detailed below.

At least some embodiments of the disclosed technologies can be described in view of the following examples:

Example 1. A computer-implemented method comprising:
  determining a first resolution for a first fragment of a video file based on a first encoding complexity of the first fragment at a bitrate;
  encoding the first fragment at the first resolution for the bitrate to generate an encoded first fragment;
  determining a second different resolution for a second fragment of the video file based on a second different encoding complexity of the second fragment at the bitrate;
  encoding the second fragment at the second different resolution for the bitrate to generate an encoded second fragment;
  receiving a request for a manifest for the video file from a client device;
  generating the manifest for the client device that identifies a single video representation for the bitrate that comprises the encoded first fragment and the encoded second fragment; and
  sending the manifest to the client device.

Example 2. The computer-implemented method of example 1, wherein a width of the second different resolution is different than a width of the first resolution and a height of the second different resolution is equal to a height of the first resolution.

Example 3. The computer-implemented method of example 1, wherein the determining the second different resolution for the second fragment comprises determining the second different resolution is a lower resolution than the first resolution when a value of a video quality metric of the second fragment at the first resolution and the bitrate is less than a threshold value and a value of the video quality metric of the first fragment at the first resolution and the bitrate is greater than or equal to the threshold value.

Example 4. A computer-implemented method comprising:
  determining a first resolution for a first proper subset of frames of a video file based on a first complexity of the first proper subset of frames at a bitrate;

encoding the first proper subset of frames at the first resolution for the bitrate to generate an encoded first proper subset of frames;

determining a second different resolution for a second proper subset of frames of the video file based on a second different complexity of the second proper subset of frames at the bitrate;

encoding the second proper subset of frames at the second different resolution for the bitrate to generate an encoded second proper subset of frames;

receiving a request for a manifest for the video file from a client device;

generating the manifest for the client device that identifies a single video representation for the bitrate that comprises the encoded first proper subset of frames and the encoded second proper subset of frames; and sending the manifest to the client device.

Example 5. The computer-implemented method of example 4, wherein a width of the second different resolution is different than a width of the first resolution and a height of the second different resolution is equal to a height of the first resolution.

Example 6. The computer-implemented method of example 4, wherein the determining the second different resolution for the second proper subset of frames comprises determining the second different resolution is a lower resolution than the first resolution when a value of a video quality metric of the second proper subset of frames at the first resolution and the bitrate is less than a threshold value and a value of the video quality metric of the first proper subset of frames at the first resolution and the bitrate is greater than or equal to the threshold value.

Example 7. The computer-implemented method of example 6, wherein the video quality metric comprises a just-noticeable difference quality metric, and the method further comprises generating the value of the just-noticeable difference quality metric of the second proper subset of frames at the first resolution and the bitrate, and generating the value of the just-noticeable difference quality metric of the first proper subset of frames at the first resolution and the bitrate.

Example 8. The computer-implemented method of example 4, wherein the determining the second different resolution for the second proper subset of frames comprises:

performing a quantization to generate a set of vertical versus horizontal frequency distribution values for at least a portion of the second proper subset of frames, and determining that one of a vertical axis and a horizontal axis of the second proper subset of frames is less detailed than the other of the vertical axis and the horizontal axis based at least in part on the vertical versus horizontal frequency distribution values, wherein the second different resolution is scaled only in the one of the vertical axis and the horizontal axis.

Example 9. The computer-implemented method of example 8, wherein the one of the vertical axis and the horizontal axis is the horizontal axis.

Example 10. The computer-implemented method of example 4, wherein the first proper subset of frames comprises a single first instantaneous decoder refresh frame and the second proper subset of frames comprises a single second instantaneous decoder refresh frame.

Example 11. The computer-implemented method of example 4, wherein the determining the second different resolution for the second proper subset of frames comprises determining the second different resolution for the second proper subset of frames of the video file based on the second different complexity of the second proper subset of frames at the bitrate and based on a current encoding compute availability.

Example 12. The computer-implemented method of example 4, wherein the video file is a live streaming file and the determining the second different resolution for the second proper subset of frames comprises determining the second different resolution for the second proper subset of frames of the video file based on the second different complexity of the second proper subset of frames at the bitrate and based on an amount of time available for encoding the second proper subset of frames.

Example 13. The computer-implemented method of example 4, wherein the video file is a live streaming file, and the determining the second different resolution for the second proper subset of frames comprises determining the second different resolution for the second proper subset of frames of the video file based on the second different complexity of the second proper subset of frames at the bitrate and based on a constraint within the client device.

Example 14. The computer-implemented method of example 13, wherein the constraint comprises a set of candidate aspect ratios that are displayable by the client device, and the first resolution and the second different resolution are in the set of candidate aspect ratios.

Example 15. A system comprising:

a content data store to store a video file; and one or more electronic devices to implement a content manager service, the content manager service including instructions that upon execution cause the content manager service to perform operations comprising:

determining a first resolution for a first proper subset of frames of the video file based on a first complexity of the first proper subset of frames at a bitrate, encoding the first proper subset of frames at the first resolution for the bitrate to generate an encoded first proper subset of frames, determining a second different resolution for a second proper subset of frames of the video file based on a second different complexity of the second proper subset of frames at the bitrate, encoding the second proper subset of frames at the second different resolution for the bitrate to generate an encoded second proper subset of frames, receiving a request for a manifest for the video file from a client device, generating the manifest for the client device that identifies a single video representation for the bitrate that comprises the encoded first proper subset of frames and the encoded second proper subset of frames, and sending the manifest to the client device.

Example 16. The system of example 15, wherein the instructions upon execution cause the content manager service to perform operations wherein a width of the second different resolution is different than a width of the first resolution and a height of the second different resolution is equal to a height of the first resolution.

Example 17. The system of example 15, wherein the instructions upon execution cause the content manager service to perform operations wherein the determining the second different resolution for the second proper subset of frames comprises determining the second different resolution is a lower resolution than the first resolution when a value of a video quality metric of the second proper subset of frames at the first resolution and the bitrate is less than a threshold value and a value of the video quality metric of the first proper subset of frames at the first resolution and the bitrate is greater than or equal to the threshold value.

Example 18. The system of example 15, wherein the instructions upon execution cause the content manager service to perform operations wherein the determining the second different resolution for the second proper subset of frames comprises:
- performing a quantization to generate a set of vertical versus horizontal frequency distribution values for at least a portion of the second proper subset of frames, and
- determining that one of a vertical axis and a horizontal axis of the second proper subset of frames is less detailed than the other of the vertical axis and the horizontal axis based at least in part on the vertical versus horizontal frequency distribution values, wherein the second different resolution is scaled only in the one of the vertical axis and the horizontal axis.

Example 19. The system of example 15, wherein the instructions upon execution cause the content manager service to perform operations wherein the first proper subset of frames comprises a single first instantaneous decoder refresh frame and the second proper subset of frames comprises a single second instantaneous decoder refresh frame.

Example 20. The system of example 15, wherein the determining the second different resolution for the second proper subset of frames comprises determining the second different resolution for the second proper subset of frames of the video file based on the second different complexity of the second proper subset of frames at the bitrate and based on a current encoding compute availability of the content manager service.

Figure 6:
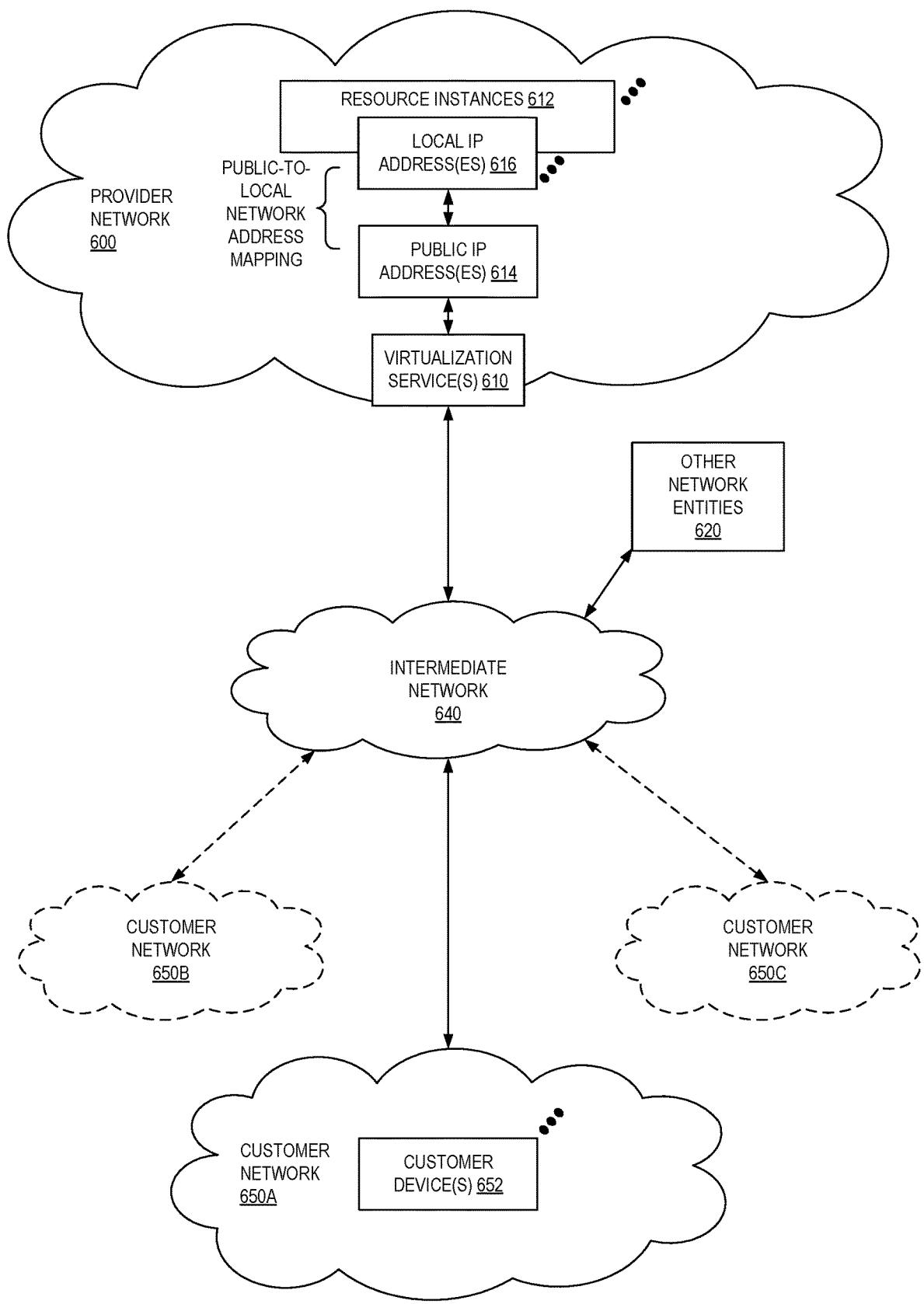
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 600, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
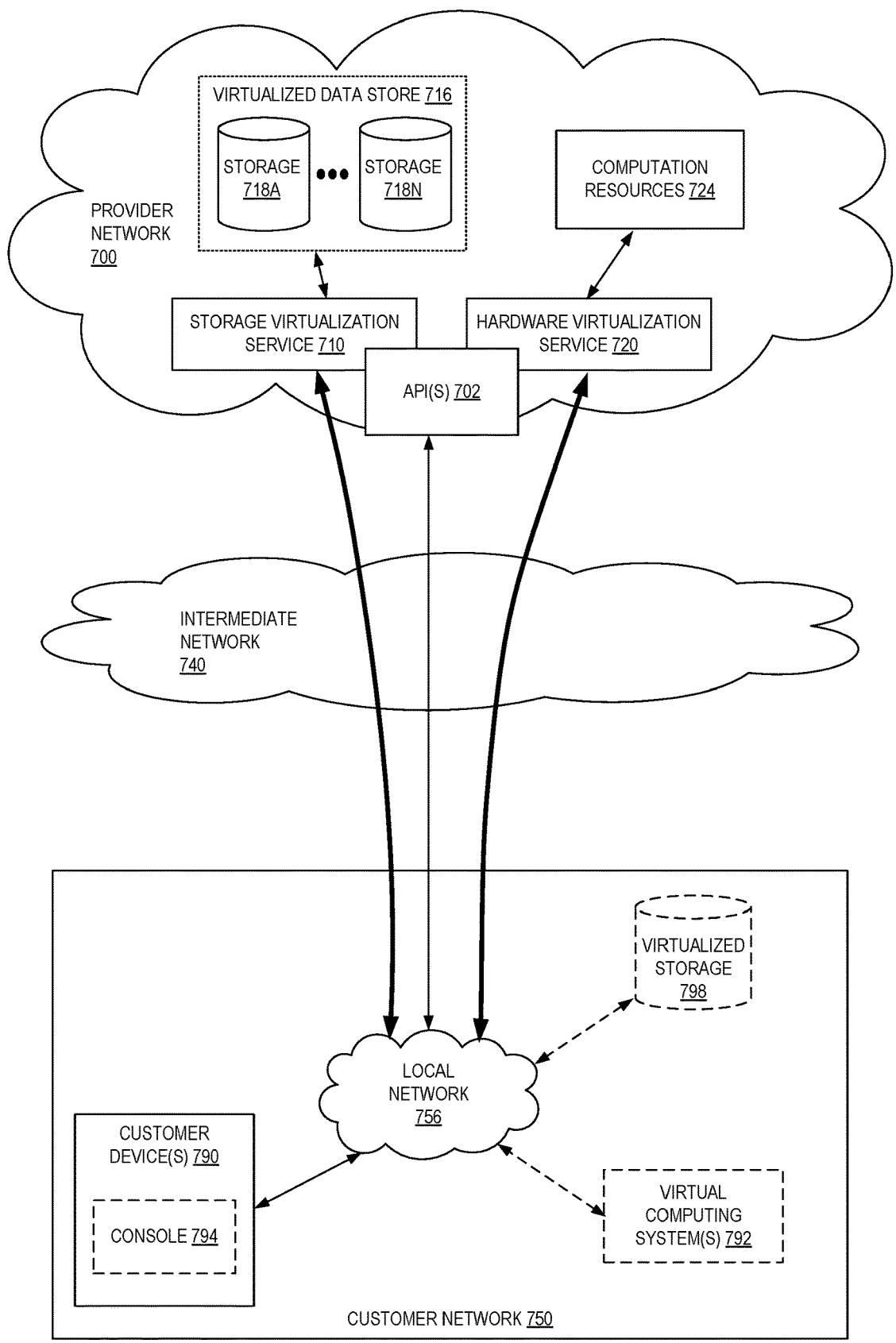
FIG. 7 is a block diagram of an example provider network that provides a storage service and a hardware virtualization service to customers according to some embodiments.

FIG. 7 is a block diagram of an example provider network that provides a storage service and a hardware virtualization service to customers, according to some embodiments.

Hardware virtualization service 720 provides multiple computation resources 724 (e.g., VMs) to customers. The computation resources 724 may, for example, be rented or leased to customers of the provider network 700 (e.g., to a customer that implements customer network 750). Each computation resource 724 may be provided with one or more local IP addresses. Provider network 700 may be configured to route packets from the local IP addresses of the computation resources 724 to public Internet destinations, and from public Internet sources to the local IP addresses of computation resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage service 710, for example via one or more APIs 702, to access data from and store data to storage resources 718A-718N of a virtual data store 716 (e.g., a folder or "bucket", a virtualized volume, a database, etc.) provided by the provider network 700. In some embodiments, a virtualized data store gateway (not shown) may be provided at the customer network 750 that may locally cache at least some data, for example frequently-accessed or critical data, and that may communicate with storage service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes via storage service 710 acting as a storage virtualization service, and these volumes may appear to the user as local (virtualized) storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Illustrative System

Figure 8:
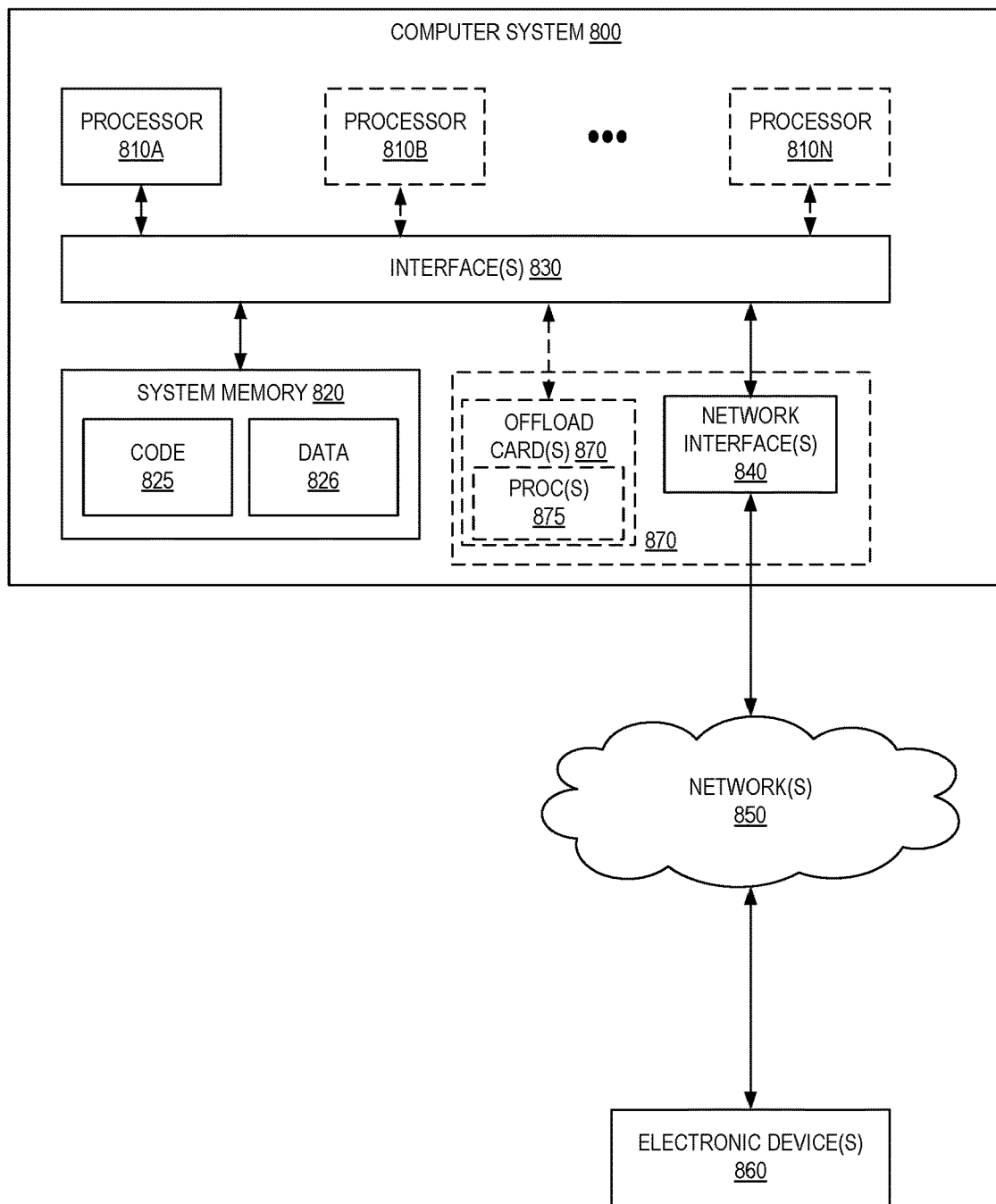
FIG. 8 is a block diagram illustrating an example computer system that may be used in some embodiments.

In some embodiments, a system that implements a portion or all of the techniques for content indexing as described herein may include a general-purpose computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 820 as code 825 and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 800 includes one or more offload cards 870 (including one or more processors 875, and possibly including the one or more network interfaces 840) that are connected using an I/O interface 830 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 800 may act as a host electronic device (e.g., operating as part of a hardware virtualization service) that hosts compute instances, and the one or more offload cards 870 execute a virtualization manager that can manage compute instances that execute on the host electronic device. As an example, in some embodiments the offload card(s) 870 can perform compute instance management operations such as pausing and/or un-pausing compute instances, launching and/or terminating compute instances, performing memory transfer/copying operations, etc. These management operations may, in some embodiments, be performed by the offload card(s) 870 in coordination with a hypervisor (e.g., upon a request from a hypervisor) that is executed by the other processors 810A-810N of the computer system 800. However, in some embodiments the virtualization manager implemented by the offload card(s) 870 can accommodate requests from other entities (e.g., from compute instances themselves), and may not coordinate with (or service) any separate hypervisor.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Figure 9:
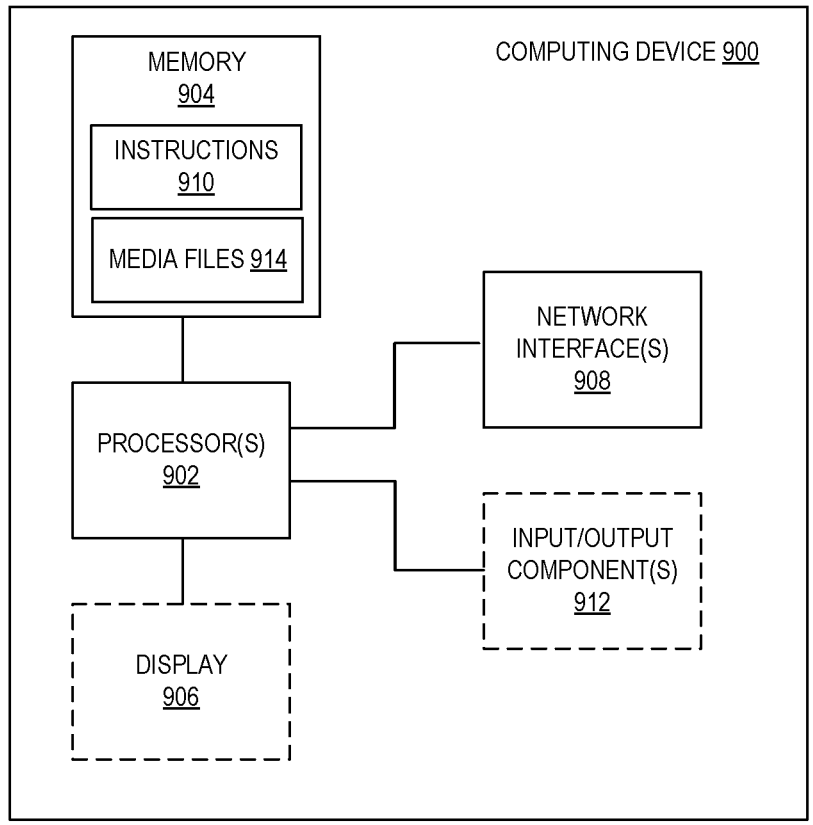
FIG. 9 illustrates a logical arrangement of a set of general components of an exemplary computing device that can be utilized in accordance with various embodiments.

FIG. 9 illustrates a logical arrangement of a set of general components of an example computing device 900. Generally, a computing device 900 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 902 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 904) to store code (for example, instructions 910, e.g., which implement a scaling service as disclosed herein) and/or media files 914 (e.g., generated by encoder 108 in FIG. 1), and a set of one or more wired or wireless network interfaces 908 allowing the electronic device to transmit data to and receive data from other computing devices, typically across one or more networks (e.g., Local Area Networks (LANs), the Internet). For example, where computing device 900 is an instance of client device 118 in FIG. 1, e.g., and is coupled via network interface(s) 908 to content delivery system 102 in FIG. 1. The coupling of the set of processors and other components is typically through one or more interconnects within the electronic device, (e.g., busses and possibly bridges). Thus, the non-transitory machine-readable storage media (e.g., memory 904) of a given electronic device typically stores code (e.g., instructions 910) for execution on the set of one or more processors 902 of that electronic device. One or more parts of various embodiments may be implemented using different combinations of software, firmware, and/or hardware.

A computing device 900 can include some type of display element 906, such as a touch screen or liquid crystal display (LCD), although many devices such as portable media players might convey information via other means, such as through audio speakers, and other types of devices such as server end stations may not have a display element 906 at all. As discussed, some computing devices used in some embodiments include at least one input and/or output component(s) 912 able to receive input from a user. This input component can include, for example, a push button, touch pad, touch screen, wheel, joystick, keyboard, mouse, keypad, or any other such device or element whereby a user is able to input a command to the device. In some embodiments, however, such a device might be controlled through a combination of visual and/or audio commands and utilize a microphone, camera, sensor, etc., such that a user can control the device without having to be in physical contact with the device.

Figure 10:
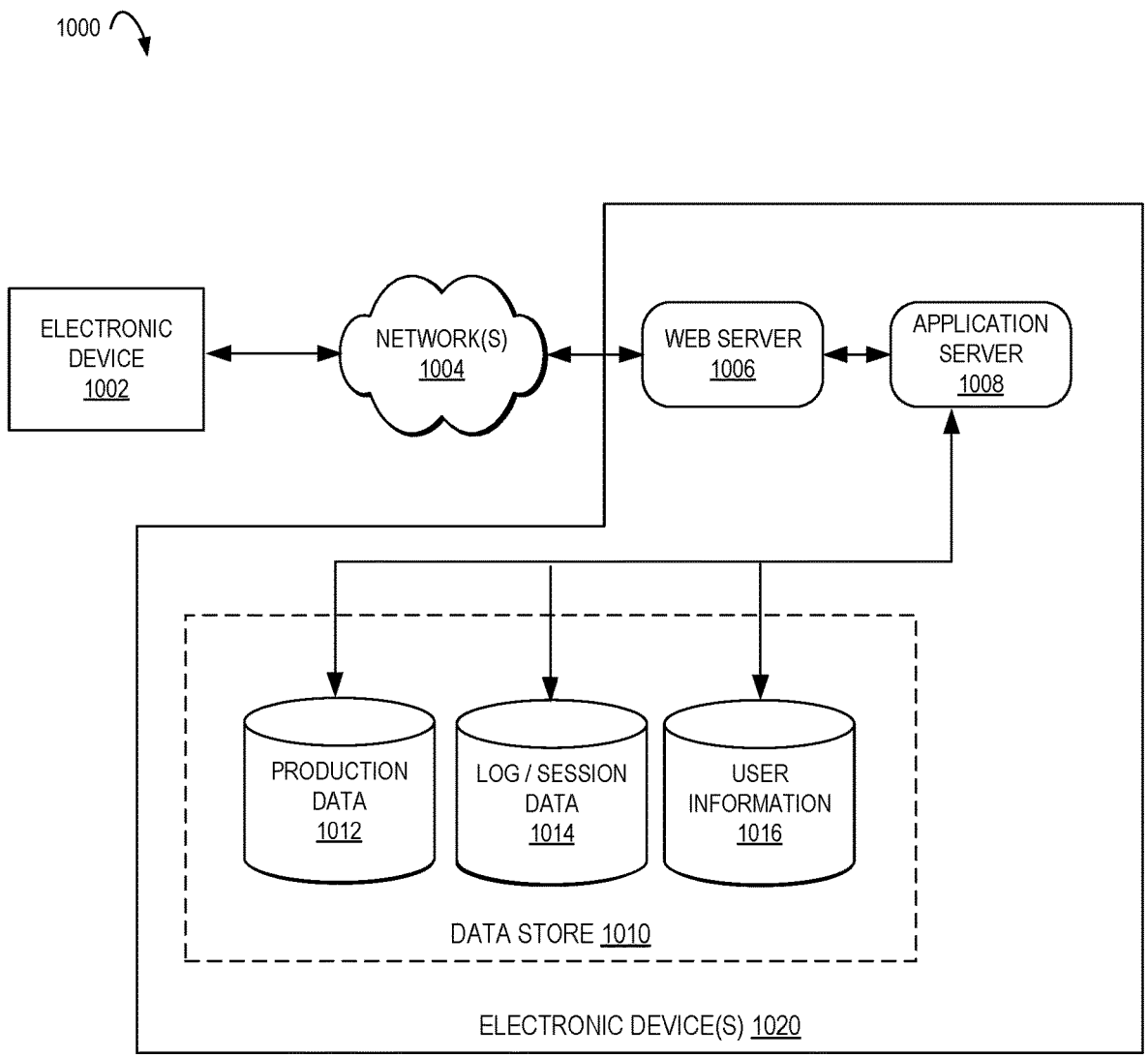
FIG. 10 illustrates an example of an environment for implementing aspects in accordance with various embodiments.

As discussed, different approaches can be implemented in various environments in accordance with the described embodiments. For example, FIG. 10 illustrates an example of an environment 1000 for implementing aspects in accordance with various embodiments. For example, in some embodiments messages are HyperText Transfer Protocol (HTTP) requests that are received by a web server (e.g., web server 1006), and the users, via electronic devices, may interact with the provider network via a web portal provided via the web server 1006 and application server 1008. As will be appreciated, although a web-based environment is used for purposes of explanation, different environments may be used, as appropriate, to implement various embodiments. The system includes an electronic client device 1002, which may also be referred to as a client device and can be any appropriate device operable to send and receive requests, messages or information over an appropriate network 1004 and convey information back to a user of the device 1002. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1004 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1004 includes the Internet, as the environment includes a web server 1006 for receiving requests and serving content in response thereto, although for other networks an alternative device serving a similar purpose could be used, as would be apparent to one of ordinary skill in the art.

The illustrative environment includes at least one application server 1008 and a data store 1010. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server 1008 can include any appropriate hardware and software for integrating with the data store 1010 as needed to execute aspects of one or more applications for the client device 1002 and handling a majority of the data access and business logic for an application. The application server 1008 provides access control services in cooperation with the data store 1010 and is able to generate content such as text, graphics, audio, video, etc., to be transferred to the client device 1002, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1002 and the application server 1008, can be handled by the web server 1006. It should be understood that the web server 1006 and application server 1008 are not required and are merely example components, as structured code discussed herein can be executed on any appropriate device or host machine as discussed elsewhere herein.

The data store 1010 can include several separate data tables, databases, or other data storage mechanisms and media for storing data relating to a particular aspect. For example, the data store illustrated includes mechanisms for storing production data 1012 and user information 1016, which can be used to serve content for the production side. The data store 1010 also is shown to include a mechanism for storing log or session data 1014. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update, or otherwise process data in response thereto. In one example, a user might submit a search request for a certain type of item. In this case, the data store 1010 might access the user information 1016 to verify the identity of the user and can access a production data 1012 to obtain information about items of that type. The information can then be returned to the user, such as in a listing of results on a web page that the user is able to view via a browser on the user device 1002. Information for a particular item of interest can be viewed in a dedicated page or window of the browser.

The web server 1006, application server 1008, and/or data store 1010 may be implemented by one or more electronic devices 1020, which can also be referred to as electronic server devices or server end stations, and may or may not be located in different geographic locations. Each of the one or more electronic devices 1020 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the environment 1000 in FIG. 10 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program code, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 718A-718N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   determining a first resolution for a first fragment of a live streaming video file based on a first just-noticeable difference quality metric of the first fragment at a bitrate;
   encoding the first fragment at the first resolution for the bitrate to generate an encoded first fragment;
   determining a second different resolution for a second fragment of the live streaming video file based on a second just-noticeable difference quality metric of the second fragment at the bitrate and based on remaining within an amount of time available for encoding of the second fragment for live viewing, wherein the determining the second different resolution for the second fragment comprises determining the second different resolution is a lower resolution than the first resolution when (i) a value of the second just-noticeable difference quality metric of the second fragment at the first resolution and the bitrate is less than a threshold value, and (ii) a value of the first just-noticeable difference quality metric of the first fragment at the first resolution and the bitrate is greater than or equal to the threshold value;

encoding the second fragment at the second different resolution for the bitrate to generate an encoded second fragment;

receiving a request for a manifest for the live streaming video file from a client device;

generating the manifest for the client device that identifies a single video representation for the bitrate that comprises the encoded first fragment and the encoded second fragment; and sending the manifest to the client device.

2. The computer-implemented method of claim 1, wherein a width of the second different resolution is different than a width of the first resolution and a height of the second different resolution is equal to a height of the first resolution.

3. A computer-implemented method comprising:
determining a first resolution for a first proper subset of frames of a live streaming video file based on a first just-noticeable difference quality metric of the first proper subset of frames at a bitrate;

encoding the first proper subset of frames at the first resolution for the bitrate to generate an encoded first proper subset of frames;

determining a second different resolution for a second proper subset of frames of the live streaming video file based on a second just-noticeable difference quality metric of the second proper subset of frames at the bitrate and based on remaining within an amount of time available for an initial encoding of the second proper subset of frames for live viewing, wherein the determining the second different resolution for the second proper subset of frames comprises determining the second different resolution is a lower resolution than the first resolution when (i) a value of the second just-noticeable difference quality metric of the second proper subset of frames at the first resolution and the bitrate is less than a threshold value, and (ii) a value of the first just-noticeable difference quality metric of the first proper subset of frames at the first resolution and the bitrate is greater than or equal to the threshold value;

encoding the second proper subset of frames at the second different resolution for the bitrate to generate an encoded second proper subset of frames;

receiving a request for a manifest for the live streaming video file from a client device;

generating the manifest for the client device that identifies a single video representation for the bitrate that comprises the encoded first proper subset of frames and the encoded second proper subset of frames; and sending the manifest to the client device.

4. The computer-implemented method of claim 3, wherein a width of the second different resolution is different than a width of the first resolution and a height of the second different resolution is equal to a height of the first resolution.

5. The computer-implemented method of claim 3, wherein the determining the second different resolution for the second proper subset of frames comprises:

performing a quantization to generate a set of vertical versus horizontal frequency distribution values for at least a portion of the second proper subset of frames, and determining that one of a vertical axis and a horizontal axis of the second proper subset of frames is less detailed than the other of the vertical axis and the horizontal axis based at least in part on the vertical versus horizontal frequency distribution values, wherein the second different resolution is scaled only in the one of the vertical axis and the horizontal axis.

6. The computer-implemented method of claim 5, wherein the one of the vertical axis and the horizontal axis is the horizontal axis.

7. The computer-implemented method of claim 3, wherein the first proper subset of frames comprises a single first instantaneous decoder refresh frame and the second proper subset of frames comprises a single second instantaneous decoder refresh frame.

8. The computer-implemented method of claim 3, wherein the determining the second different resolution for the second proper subset of frames comprises determining the second different resolution for the second proper subset of frames of the live streaming video file based on a current encoding compute resource availability.

9. The computer-implemented method of claim 3, wherein the determining the second different resolution for the second proper subset of frames comprises determining the second different resolution for the second proper subset of frames of the live streaming video file based on a constraint within the client device.

10. The computer-implemented method of claim 9, wherein the constraint comprises a set of candidate aspect ratios that are displayable by the client device, and the first resolution and the second different resolution are in the set of candidate aspect ratios.

11. A system comprising:
a non-transitory content data store to receive a live streaming video file; and one or more electronic devices to implement a content manager service, the content manager service including instructions that upon execution cause the content manager service to perform operations comprising:
determining a first resolution for a first proper subset of frames of the live streaming video file based on a first just-noticeable difference quality metric of the first proper subset of frames at a bitrate, encoding the first proper subset of frames at the first resolution for the bitrate to generate an encoded first proper subset of frames, determining a second different resolution for a second proper subset of frames of the live streaming video file based on a second just-noticeable difference quality metric of the second proper subset of frames at the bitrate and based on remaining within an amount of time available for an initial encoding of the second proper subset of frames for live viewing, wherein the determining the second different resolution for the second proper subset of frames comprises determining the second different resolution is a lower resolution than the first resolution when (i) a value of the second just-noticeable difference quality metric of the second proper subset of frames at the first resolution and the bitrate is less than a threshold value and (ii) a value of the first just-noticeable difference quality metric of the first proper subset of frames at the first resolution and the bitrate is greater than or equal to the threshold value, encoding the second proper subset of frames at the second different resolution for the bitrate to generate an encoded second proper subset of frames, receiving a request for a manifest for the live streaming video file from a client device, generating the manifest for the client device that identifies a single video representation for the bitrate that comprises the encoded first proper subset of frames and the encoded second proper subset of frames, and sending the manifest to the client device.

12. The system of claim 11, wherein the instructions upon execution cause the content manager service to perform operations wherein a width of the second different resolution is different than a width of the first resolution and a height of the second different resolution is equal to a height of the first resolution.

13. The system of claim 11, wherein the instructions upon execution cause the content manager service to perform operations wherein the determining the second different resolution for the second proper subset of frames comprises:

performing a quantization to generate a set of vertical versus horizontal frequency distribution values for at least a portion of the second proper subset of frames, and determining that one of a vertical axis and a horizontal axis of the second proper subset of frames is less detailed than the other of the vertical axis and the horizontal axis based at least in part on the vertical versus horizontal frequency distribution values, wherein the second different resolution is scaled only in the one of the vertical axis and the horizontal axis.

14. The system of claim 11, wherein the instructions upon execution cause the content manager service to perform operations wherein the first proper subset of frames comprises a single first instantaneous decoder refresh frame and the second proper subset of frames comprises a single second instantaneous decoder refresh frame.

15. The system of claim 11, wherein the determining the second different resolution for the second proper subset of frames comprises determining the second different resolution for the second proper subset of frames of the live streaming video file based on a current encoding compute resource availability of the content manager service.

* * * * *